(12) United States Patent
Whiteman

(10) Patent No.: US 11,746,866 B2
(45) Date of Patent: Sep. 5, 2023

(54) MULTI-IDLER SINGLE CHAIN DRIVE

(71) Applicant: DEERE & COMPANY, Moline, IL (US)

(72) Inventor: Steven Ryan Whiteman, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 486 days.

(21) Appl. No.: 17/092,794

(22) Filed: Nov. 9, 2020

(65) Prior Publication Data
US 2022/0145969 A1 May 12, 2022

(51) Int. Cl.
| | | |
|---|---|---|
| *F16H 37/00* | (2006.01) | |
| *F16H 37/06* | (2006.01) | |
| *F16H 7/06* | (2006.01) | |
| *F16H 57/035* | (2012.01) | |
| *B60K 17/342* | (2006.01) | |
| *B60T 13/22* | (2006.01) | |

(Continued)

(52) U.S. Cl.
CPC ......... *F16H 37/065* (2013.01); *B60K 17/342* (2013.01); *F16H 7/06* (2013.01); *F16H 57/035* (2013.01); *B60T 1/062* (2013.01); *B60T 1/065* (2013.01); *B60T 13/22* (2013.01); *F16H 57/05* (2013.01)

(58) Field of Classification Search
CPC ....... B62D 55/305; F16H 37/065; F16H 7/06; F16H 57/035; F16H 57/05; F16H 7/18; F16H 55/303; B60K 17/342; B60T 1/062; B60T 1/065; B60T 13/22; B60Y 2200/411; B60Y 2200/415

See application file for complete search history.

(56) References Cited

U.S. PATENT DOCUMENTS

| 1,390,986 A | 9/1921 | Dain | |
|---|---|---|---|
| 1,751,394 A * | 3/1930 | Christie | B60K 17/36 |
| | | | 180/24.05 |
| 3,620,321 A | 11/1971 | Thibodeau | |

(Continued)

FOREIGN PATENT DOCUMENTS

DE  7013514 U  11/1970

OTHER PUBLICATIONS

German Search Report issued in application No. DE102021210762.1 dated May 4, 2022 (10 pages).

*Primary Examiner* — Victor L MacArthur
(74) *Attorney, Agent, or Firm* — Taft Stettinius & Hollister LLP; Stephen F. Rost

(57) ABSTRACT

A single chain drive is disclosed that includes a drive sprocket, a drive motor, idler sprockets, front and rear axle sprockets, and a single chain. The drive motor rotates the drive sprocket, which rotates the idler sprockets, which rotate the single chain, which rotates the front and rear axle sprockets. The drive sprocket can be a lantern gear with covers, and pins that connect the cover, and the idler sprockets can have teeth that mesh with the pins between the covers of the drive sprocket. A drive shaft can couple the drive motor and drive sprocket, and an integrated parking brake can prevent rotation of the drive shaft when engaged. A chain case with lubricant can enclose the drive sprocket, idler sprockets, chain, and axle sprockets. The drive sprocket, idler sprockets and axle sprockets can be sized to provide a desired gear reduction.

20 Claims, 6 Drawing Sheets

(51) Int. Cl.
   *F16H 57/05*   (2006.01)
   *B60T 1/06*    (2006.01)

(56) References Cited

U.S. PATENT DOCUMENTS

| | | |
|---|---|---|
| 3,860,080 A | 1/1975 | Firstenberg |
| 3,861,481 A | 1/1975 | Gillette et al. |
| 2004/0045747 A1 | 3/2004 | Albright et al. |
| 2011/0059821 A1* | 3/2011 | Lee .................. F16H 55/56 |
| | | 474/8 |
| 2011/0254363 A1 | 10/2011 | Boivin |

* cited by examiner

MULTI-IDLER SINGLE CHAIN DRIVE

FIELD OF THE DISCLOSURE

The present disclosure relates to four wheel drive vehicles, and more specifically relates to chain drive assemblies used in four wheel drive vehicles.

BACKGROUND

A four wheel drive vehicle with a chain drive typically uses two chains per side, or one chain per wheel. The vehicle typically has a drive motor on each side of the vehicle that drives both a front and rear wheel with a separate chain between the drive motor and each wheel. This double-chain per side configuration requires width for side-by side drive chains. To get the desired speed-reduction/torque-multiplication, this double-chain per side configuration typically requires a small drive sprocket which can require large motor support bearings, and can increase chain loading on the drive motor.

It would be desirable to have a single-chain per side configuration that can utilize less space and/or fewer components. The single-chain per side configuration can accomplish the desired speed-reduction/torque-multiplication using sprocket idlers which can also reduce the chain loading on the drive motor and allows the use of smaller motor bearings.

SUMMARY

A single chain drive for one side of an all-wheel drive vehicle is disclosed. The single chain drive includes a drive sprocket, a drive motor, a first idler sprocket, a front axle sprocket, a rear axle sprocket and a single chain. The drive motor is coupled to the drive sprocket and is configured to rotate the drive sprocket in forward and reverse directions. The first idler sprocket is coupled to the drive sprocket and is configured to rotate with the drive sprocket in the forward and reverse directions. The front axle sprocket is coupled to a front axle, and is configured to rotate the front axle in the forward and reverse directions. The rear axle sprocket is coupled to a rear axle, and is configured to rotate the rear axle in the forward and reverse directions. The single chain is coupled to the first idler sprocket, the front axle sprocket and the rear axle sprocket. The drive motor rotates the drive sprocket, which rotates the first idler sprocket, which rotates the single chain, which rotates the front and rear axle sprockets, which rotate the front and rear axles, respectively.

The drive sprocket can be a lantern gear that includes front and back covers, and multiple pins, where each of the pins has a proximal end connected to the back cover and a distal end connected to the front cover. Each of the pins can have a rear needle bearing that connects the proximal end of the pin to the back cover, and a front needle bearing that connects the distal end of the pin to the front cover. The first idler sprocket can have teeth configured to mesh with the pins of the drive sprocket between the back and front covers of the drive sprocket.

The single chain drive can also include a drive shaft configured to couple the drive motor to the drive sprocket. The drive shaft can be connected to the back and front covers of the drive sprocket. The drive motor can rotate the drive shaft, which can rotate the drive sprocket, which rotates the first idler sprocket, which rotates the single chain, which rotates the front and rear axle sprockets, which rotate the front and rear axles, respectively.

The single chain drive can also include an integrated parking brake, where engagement of the parking brake prevents rotation of the drive shaft, and disengagement of the parking brake allows rotation of the drive shaft. The single chain drive can also include a stationary housing, and the integrated parking brake can include an engagement member, a brake disc and a stationary reactionary member. The brake disc can be rigidly coupled to the drive shaft, and can rotate with the drive shaft. The stationary reactionary member can be rigidly coupled to the stationary housing, and can remain stationary. When the parking brake is engaged, the engagement member can activate to compress the brake disc against the stationary reactionary member to prevent rotation of the drive shaft. When the parking brake is disengaged, the engagement member can allow the brake disc and the drive shaft to rotate freely.

The single chain drive can also include a chain case that encloses the drive sprocket, the first idler sprocket, the single chain, and the front and rear axle sprockets; and that holds lubricant to keep the single chain and sprocket connections lubricated. The drive sprocket, the first idler sprocket and the front and rear axle sprockets can be sized to provide a desired gear reduction.

The single chain drive can include first and second idler sprockets that are each coupled to the drive sprocket and the single chain. The idler sprockets can rotate with the drive sprocket in the forward and reverse directions. The drive motor can rotate the drive sprocket, which can rotate the first and second idler sprockets, which can rotate the single chain, which rotates the front and rear axle sprockets, which rotate the front and rear axles, respectively. The first idler sprocket can be positioned above the drive sprocket between the drive sprocket and the single chain, and the second idler sprocket can be positioned below the drive sprocket between the drive sprocket and the single chain. The drive sprocket can be a floating lantern gear that includes front and back covers, and pins that connect the front and back covers, and each of the first and second idler sprockets can have teeth that mesh with the pins of the drive sprocket between the back and front covers of the drive sprocket. The single chain drive can also include a drive shaft that couples the drive motor to the drive sprocket, where the drive motor rotates the drive shaft, which rotates the drive sprocket, which rotates the first and second idler sprocket, which rotate the single chain, which rotates the front and rear axle sprockets, which rotate the front and rear axles, respectively.

The single chain drive can include first, second, third and fourth idler sprockets that are each coupled to the drive sprocket and the single chain, and are each configured to rotate with the drive sprocket in the forward and reverse directions. The drive motor can rotate the drive sprocket, which can rotate the first, second, third and fourth idler sprockets, which can rotate the single chain, which rotates the front and rear axle sprockets, which rotate the front and rear axles, respectively. The first idler sprocket can be positioned above and forward of the drive sprocket, between the drive sprocket and the single chain. The second idler sprocket can be positioned below and forward of the drive sprocket, between the drive sprocket and the single chain. The third idler sprocket can positioned below and rearward of the drive sprocket, between the drive sprocket and the single chain. The fourth idler sprocket can be positioned above and rearward of the drive sprocket, between the drive sprocket and the single chain. The drive sprocket can be a floating lantern gear that includes front and back covers, and pins that connect the front and back covers, each of the four idler sprockets can have teeth to mesh with the pins of the drive sprocket between the front and back covers of the drive sprocket. The single chain drive can also include a drive shaft that couples the drive motor to the drive sprocket, where the drive motor can rotate the drive shaft, which can rotate the drive sprocket, which can rotate the first, second, third and fourth idler sprockets, which rotate the single chain, which rotates the front and rear axle sprockets, which rotate the front and rear axles, respectively. The single chain drive can include a chain case that encloses the drive sprocket, the first, second, third and fourth idler sprockets, the single chain, and the front and rear axle sprockets; and that holds lubricant to keep the single chain and sprocket connections lubricated. The drive sprocket, the first, second, third and fourth idler sprockets and the front and rear axle sprockets can be sized to provide a desired gear reduction.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
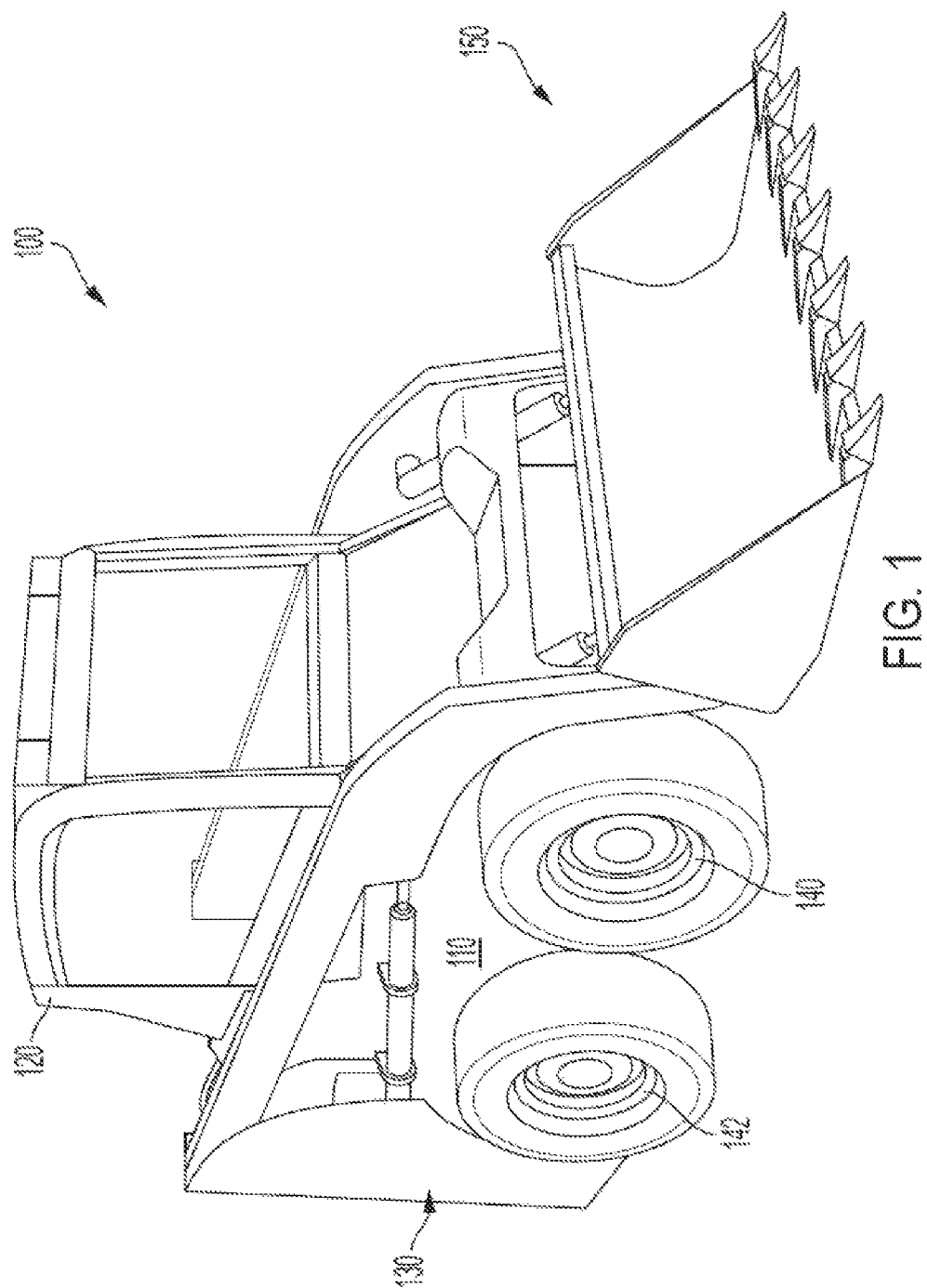
FIG. 1 illustrates a right side view of an exemplary vehicle that can include the improved single-chain chain drive.

FIG. 1 illustrates a right side view of an exemplary vehicle 100 that includes a body 110, an operator cab 120, an engine compartment 130 with an engine, a front wheel 140 and a rear wheel 142 in contact with the ground and an attachment 150. There is also a front wheel 140 and a rear wheel 142 in contact with the ground on the left-side of the vehicle 100. The wheels 140, 142 are coupled to a drive assembly powered by the engine to move the vehicle 100. The operation of the vehicle 100 is controlled from the operator cab 120 which includes one or more controls for controlling the operation of the vehicle 100 and the attachment 150.

Figure 2:
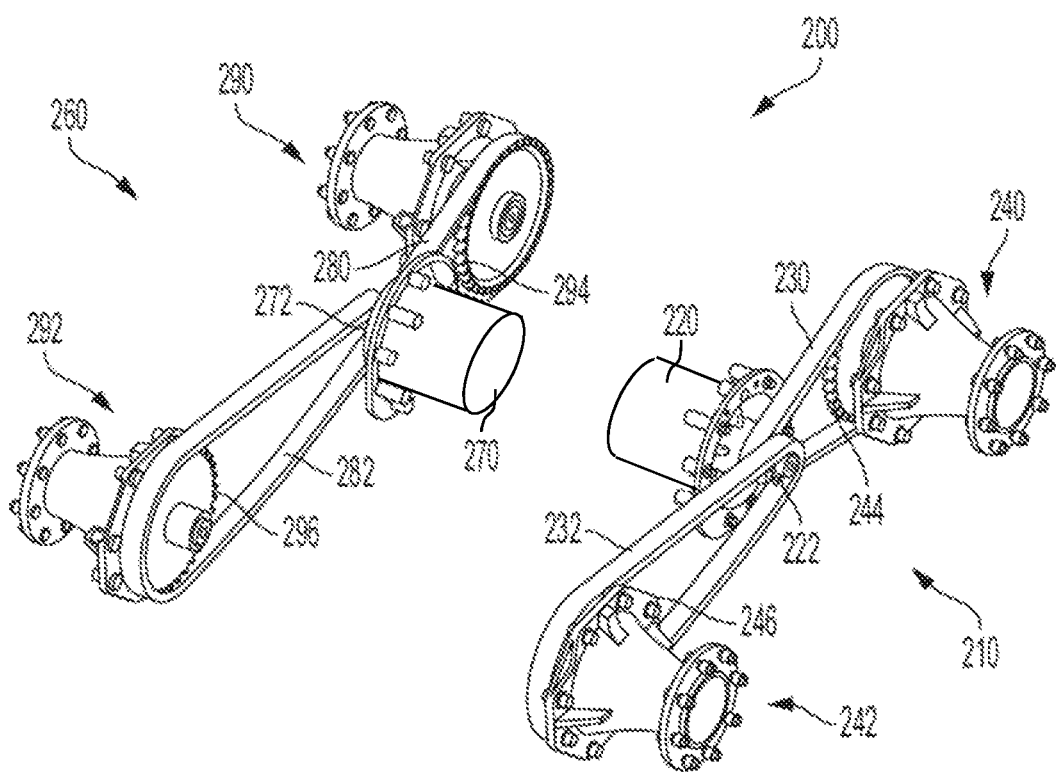
FIG. 2 illustrates a typical double-chain chain drive assembly that can be used on the vehicle without the vehicle body.
Figure 3:
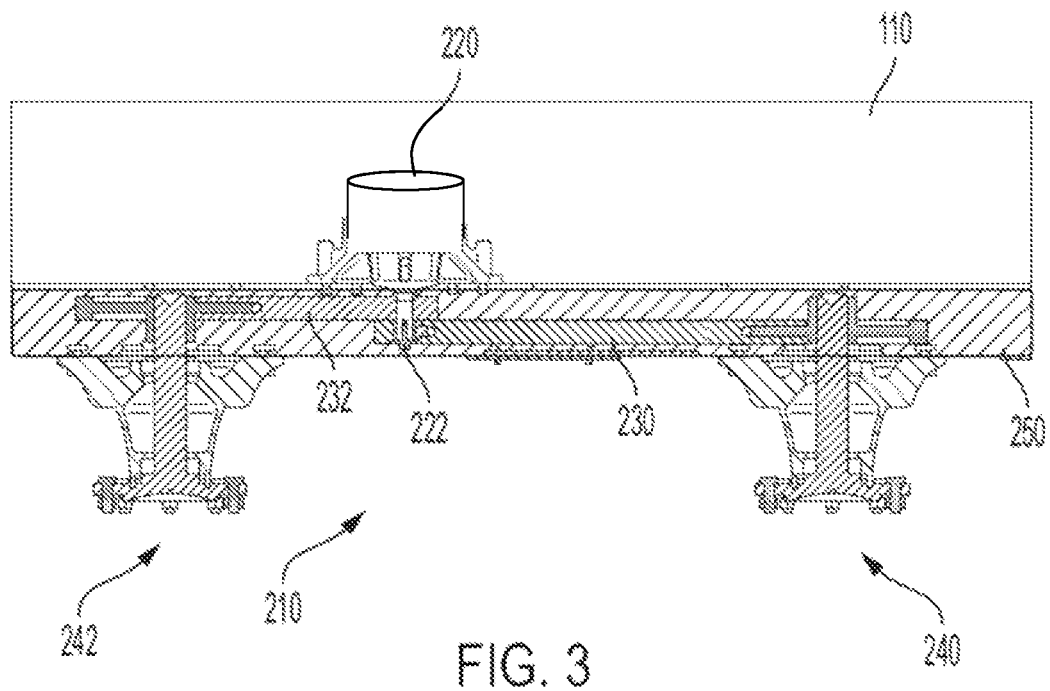
FIG. 3 illustrates the right-side double-chain chain drive assembly with the chain case attached to the vehicle body.

FIGS. 2 and 3 illustrate a typical four wheel chain drive assembly 200 that can be used on the vehicle 100. FIG. 2 illustrates the four wheel chain drive assembly 200 without the vehicle body 110, and shows that the four wheel chain drive assembly 200 includes a right-side assembly 210 and a left-side assembly 260. FIG. 3 illustrates the right-side assembly 210 and shows a chain case 250 attached to the vehicle body 110.

The right-side assembly 210 includes a right-side motor 220, a right-side drive sprocket 222, a front-right chain 230, a rear right chain 232, a front-right axle 240 with a front-right axle sprocket 244, a rear-right axle 242 with a rear-right axle sprocket 246, and a right-side chain case 250. The right-side motor 220 is connected to the right-side drive sprocket 222, and rotates the right-side drive sprocket 222 in forward and reverse directions. The front-right chain 230 connects the right-side drive sprocket 222 to the front-right axle sprocket 244 which rotates with the front-right axle 240, and the rear-right chain 232 connects the right-side drive sprocket 222 to the rear-right axle sprocket 246 which rotates with the rear-right axle 242. The right-side drive sprocket 222, the front-right chain 230, the rear-right chain 232, the front-right axle sprocket 244, and the rear-right axle sprocket 246 are enclosed in the right-side chain case 250 which contains oil to keep the drive chains and sprocket connections of the right-side assembly 210 lubricated. The front-right axle 240 is connected to and drives the front wheel 140, and the rear-right axle 242 is connected to and drives the rear wheel 142 on the right-side of the vehicle 100. Thus, the right-side motor 220 can rotate the right-side drive sprocket 222 in the forward and reverse directions, which turns the front-right and rear-right chains 230, 232, which drives the front-right and rear-right axle sprockets 244, 246 and axles 240, 242, and the wheels 140, 142, respectively, on the right-side of the vehicle 100 in the forward and reverse directions.

Similarly, the left-side assembly 260 includes a left-side motor 270, a left-side drive sprocket 272, a front-left chain 280, a rear-left chain 282, a front-left axle 290 with a front-left axle sprocket 294, a rear-left axle 292 with a rear-left axle sprocket 296, and a left-side chain case. The left-side chain case is a mirror-image of the right-side chain case 250. The left-side motor 270 is connected to the left-side drive sprocket 272, and rotates the left-side drive sprocket 272 in forward and reverse directions. The front-left chain 280 connects the left-side drive sprocket 272 to the front-left axle sprocket 294 which rotates with the front-left axle 290, and the rear-left chain 282 connects the left-side drive sprocket 272 to the rear-left axle sprocket 296 which rotates with the rear-left axle 292. The left-side drive sprocket 272, the front-left chain 280, the rear-left chain 282, the front-left axle sprocket 294, and the rear-left axle sprocket 296 are enclosed in the left-side chain case which contains oil to keep the drive chains and sprocket connections of the left-side assembly 260 lubricated. The front-left axle 290 is connected to and drives the front wheel 140, and the rear-left axle 292 is connected to and drives the rear wheel 142 on the left-side of the vehicle 100. Thus, the left-side motor 270 can rotate the left-side drive sprocket 272 in the forward and reverse directions, which turns the front-left and rear-left chains 280, 282, which drives the front-left and rear-left axle sprockets 294, 296 and axles 290, 292, and the wheels 140, 142, respectively, on the left-side of the vehicle 100 in the forward and reverse directions.

As explained above, the four wheel chain drive assembly 200 includes four chains, two per side, where the front-right chain 230 and the rear-right chain 232 are side-by-side at the right-side drive sprocket 222, and the front-left chain 280 and the rear-left chain 282 are side-by-side at the left-side drive sprocket 272. Thus, the right-side chain case 250 must be at least as wide as the side-by-side front-right and rear-right chains 230, 232; and the left-side chain case must be at least as wide as the side-by-side front-left and rear-left chains 280, 282.

Figure 4:
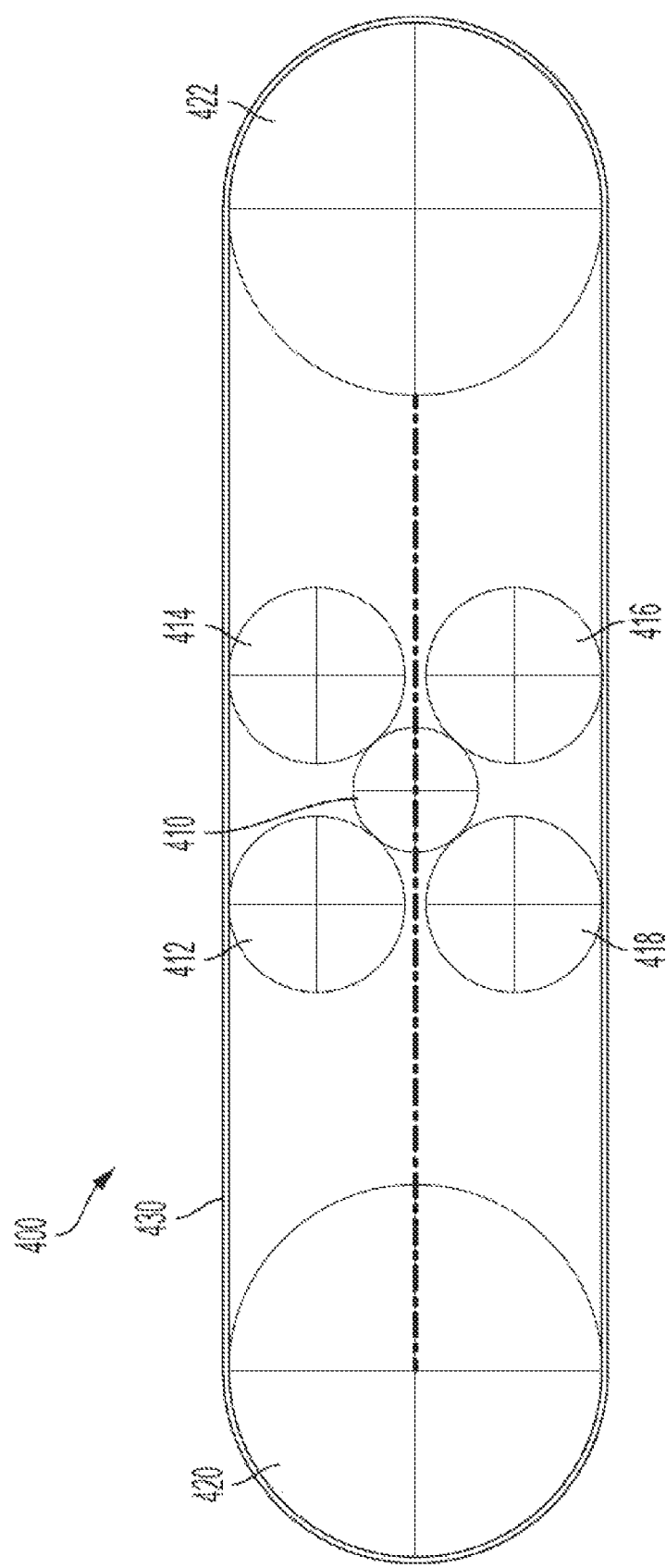
FIG. 4 depicts a schematic of the improved single-chain drive assembly without the vehicle body.
Figure 5:
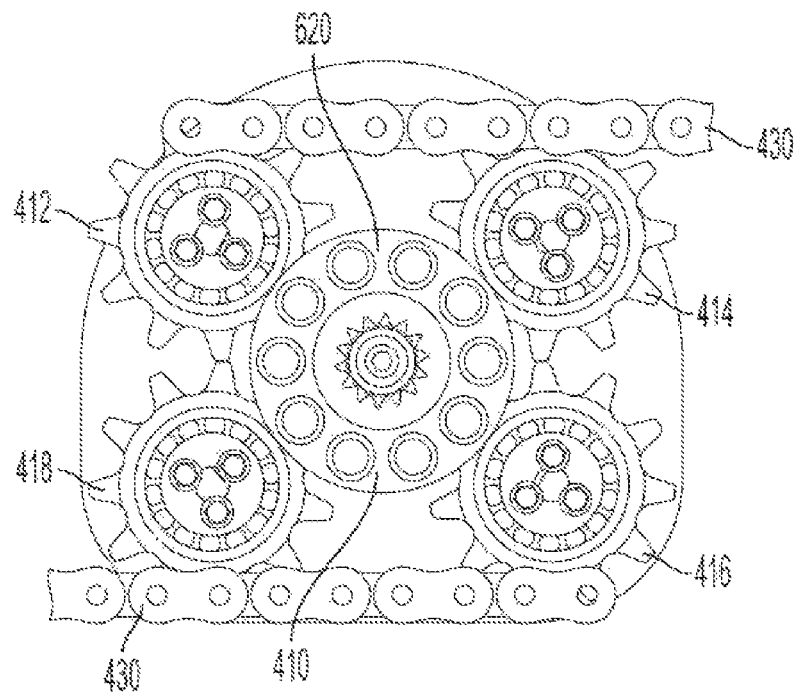
FIG. 5 illustrates a front-view of the center portion of the improved single-chain drive assembly.
Figure 6:
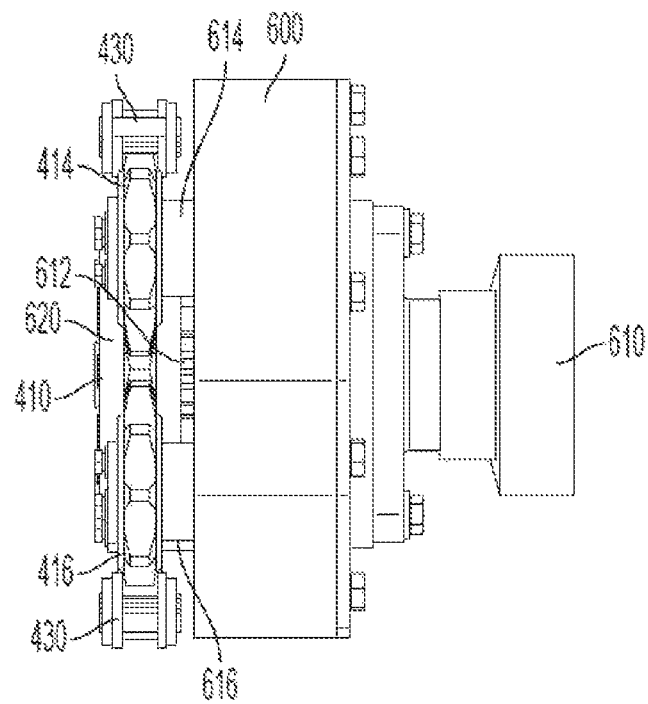
FIG. 6 illustrates a side view of the central portion of the improved single-chain drive assembly.

FIG. 4 illustrates a schematic of one side, right or left, of an improved four wheel chain drive assembly 400 without the vehicle body 110. FIG. 5 illustrates a front-view and FIG. 6 illustrates a side-view of the center portion of the improved four wheel chain drive assembly 400. The one side of the improved four wheel chain drive assembly 400 includes a floating lantern drive gear 410, four idler sprockets 412, 414, 416, 418, a front axle 420, a rear axle 422, a drive chain 430 and a drive motor 610.

The drive motor 610 is connected to the floating lantern gear 410, and rotates the drive gear 410 in forward and reverse directions. The four idler sprockets 412, 414, 416, 418 connect the chain 430 to the lantern gear 410. The chain 430 connects the lantern gear 410 and idler sprockets 412-418 to the front and rear axles 420, 422. The lantern gear 410, the idler sprockets 412-418, the chain 430 and the axle sprockets of the front and rear axles 420, 422 are enclosed in a chain case 810 which contains oil to keep the drive chain and sprocket connections lubricated. The front axle 420 is connected to and drives the front wheel 140, and the rear-right axle 422 is connected to and drives the rear wheel 142 on one-side of the vehicle 100. Thus, the drive motor 610 can rotate the lantern gear 410 in the forward and reverse directions, which turns the idler sprockets 412-418 and the chain 430, which drives the front and rear axles 420, 422 and wheels 140, 142, respectively, on the one-side of the vehicle 100 in the forward and reverse directions.

Figure 7:
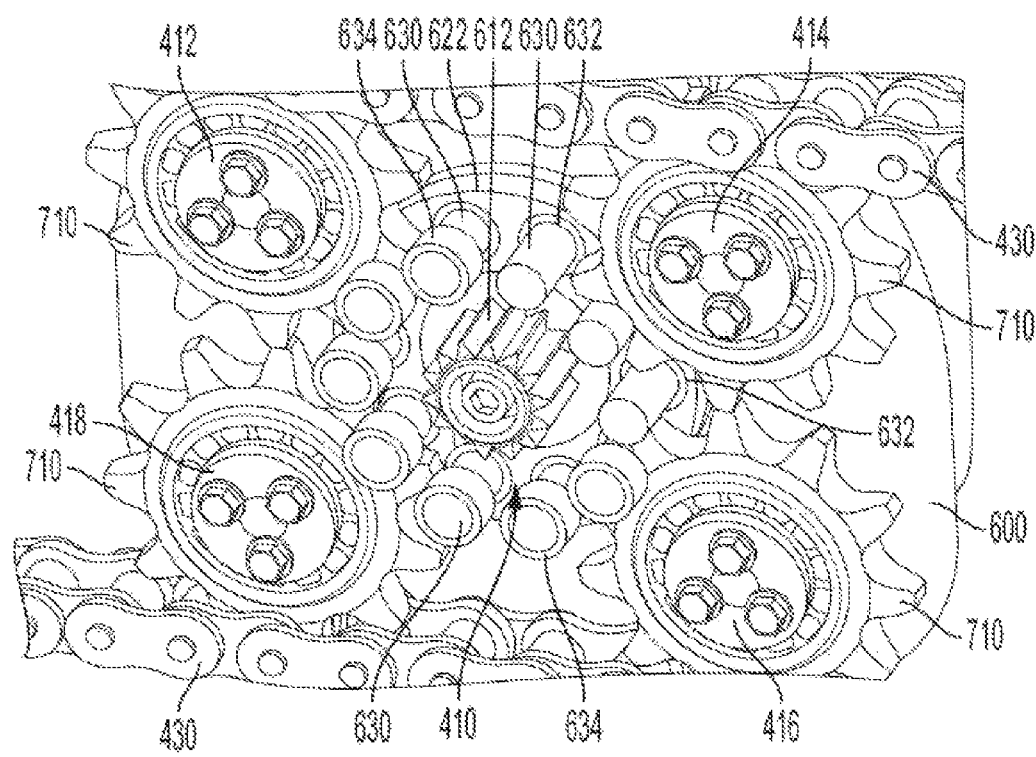
FIG. 7 illustrates a front-view of the central portion of the improved single-chain drive assembly with the front cover of the lantern gear removed.

FIG. 6 illustrates a side view of the central portion of the improved four wheel chain drive assembly 400, and FIG. 7 illustrates a front-view of the central portion of the improved four wheel chain drive assembly 400 with the front cover 620 of the lantern gear 410 removed, where the central portion includes the lantern drive gear 410 and the idler sprockets 412, 414, 416, 418. FIG. 6 shows a central housing 600, the drive motor 610 attached to a rear side of the central housing 600 and a drive shaft 612 extending from the drive motor 610, through the central housing 600 and into the lantern drive gear 410. Each of the idler sprockets 412, 414, 416, 418 is mounted on an associated rotatable idler mount. The view of FIG. 6 shows idler sprocket 414 mounted on idler mount 614, and idler sprocket 416 mounted on idler mount 616.

FIG. 7 illustrates the drive shaft 612 extends through the center of a back cover 622 of the lantern gear 410, and the outer portion of the lantern gear 410 has a plurality of pins 630 where each of the pins 630 has a rear needle bearing 632 and a front needle bearing 634, where the rear needle bearing 632 connects the pin 630 to the back cover 622 of the lantern gear 410, and the front needle bearing 634 connects the pin 630 to the front cover 620 of the lantern gear 410. Each of the idler sprockets 412, 414, 416, 418 has a plurality of teeth 710. The drive shaft 612 extends from the drive motor 610, through the back cover 622 of the lantern gear 410, and is connected to the center of the front and back covers 620, 622 of the lantern gear 410. The pins 630 are connected to the front and back covers 620, 622 of the lantern gear 410 and rotate with the lantern gear 410. The teeth 710 of the idler sprockets 412, 414, 416, 418 mesh with the pins 630 between the front and back covers 620, 622 of the lantern gear 410. The teeth 710 of the idler sprockets 412, 414, 416, 418 also mesh with the links of the drive chain 430. Rotation of the drive shaft 612 by the drive motor 610 rotates the lantern gear 410 and its pins 630. Due to the meshing of the teeth 710 with the pins 630, rotation of the lantern gear 410 and its pins 630 rotates the idler sprockets 412, 414, 416, 418. Due to the meshing of the teeth 710 with the links of the drive chain 430, rotation of the idler sprockets 412, 414, 416, 418 rotates the drive chain 430. Due to the meshing of the teeth of the axle sprockets of the axles 420, 422 with the links of the drive chain 430, rotation of the drive chain 430 rotates the axle sprockets of the axles 420, 422, which rotates the axles 420, 422, which rotates the front and rear wheels 140, 142 of the vehicle 100.

The lantern gear 410, idler sprockets 412, 414, 416, 418 and axle sprockets of the axles 420, 422 can be sized to provide the desired gear reduction. As one example, and not for limitation, to provide a 3.4:1 gear reduction, the lantern gear 410 can have 10 pins, each of the idler sprockets 412-418 can have 11 teeth, and each of the front and rear axles can have 34 teeth. To provide the exemplary 3.4:1 gear reduction, the prior four wheel chain drive assembly 200 typically uses small diameter drive sprockets 222, 272 on each side, the small diameter drive sprockets with the chains directly connected put added loads on the motors 220, 270 which requires larger bearings to be used, and also puts added tension on the drive chains 230, 232, 280, 282 when making the tight loop around the small diameter drive sprockets 222, 272. In contrast, the floating lantern gear 410 of the improved four wheel chain drive assembly 400 does not experience the direct pulling of the chains or the tension of a small diameter turn of the chain on the drive gear and thus can use smaller motor bearings.

Figure 8:
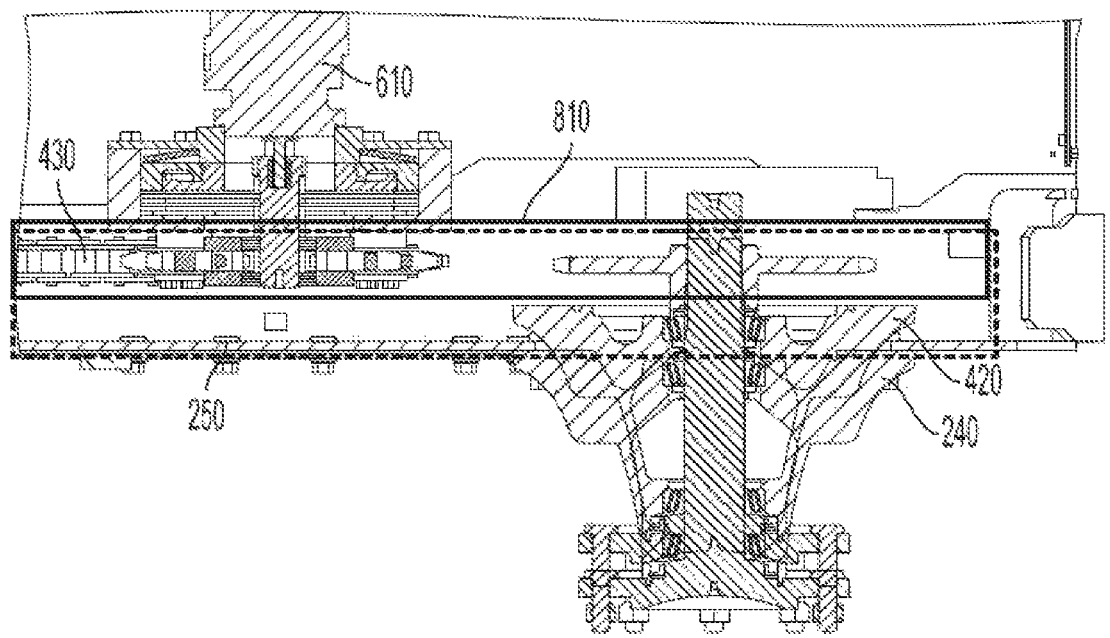
FIG. 8 depicts the narrower chain case of the improved single-chain drive assembly versus the wider chain case of the prior double-chain drive assembly.

As explained above, the improved four wheel chain drive assembly 400 only uses two chains, one per side, where the one chain 430 on each side drives both the front and rear axles 420, 422. Thus, the chain case 810 on each side only has to be as wide as the width of one chain. FIG. 8 depicts the narrower chain case 810 of the improved four wheel chain drive assembly 400 versus the wider chain case 250 of the prior four wheel chain drive assembly 200 (see FIG. 3), and optional movement of the axles 420, 422 on each side of the vehicle 100 in toward the center of the vehicle 100 versus the positions of the axles 240, 242. By replacing the double drive sprocket 222 and the side-by-side chains 230, 232 of the old design with a single lantern gear 410 and single chain 430, the width required for the chain case can be reduced on each side of the vehicle 100. As an example, if the reduction is 45 millimeters (mm) on each side then this enables a 90 mm reduction which can be used to narrow the overall vehicle width by 90 mm, or to increase the space between the chain cases by 90 mm, or some combination of both.

Figure 9:
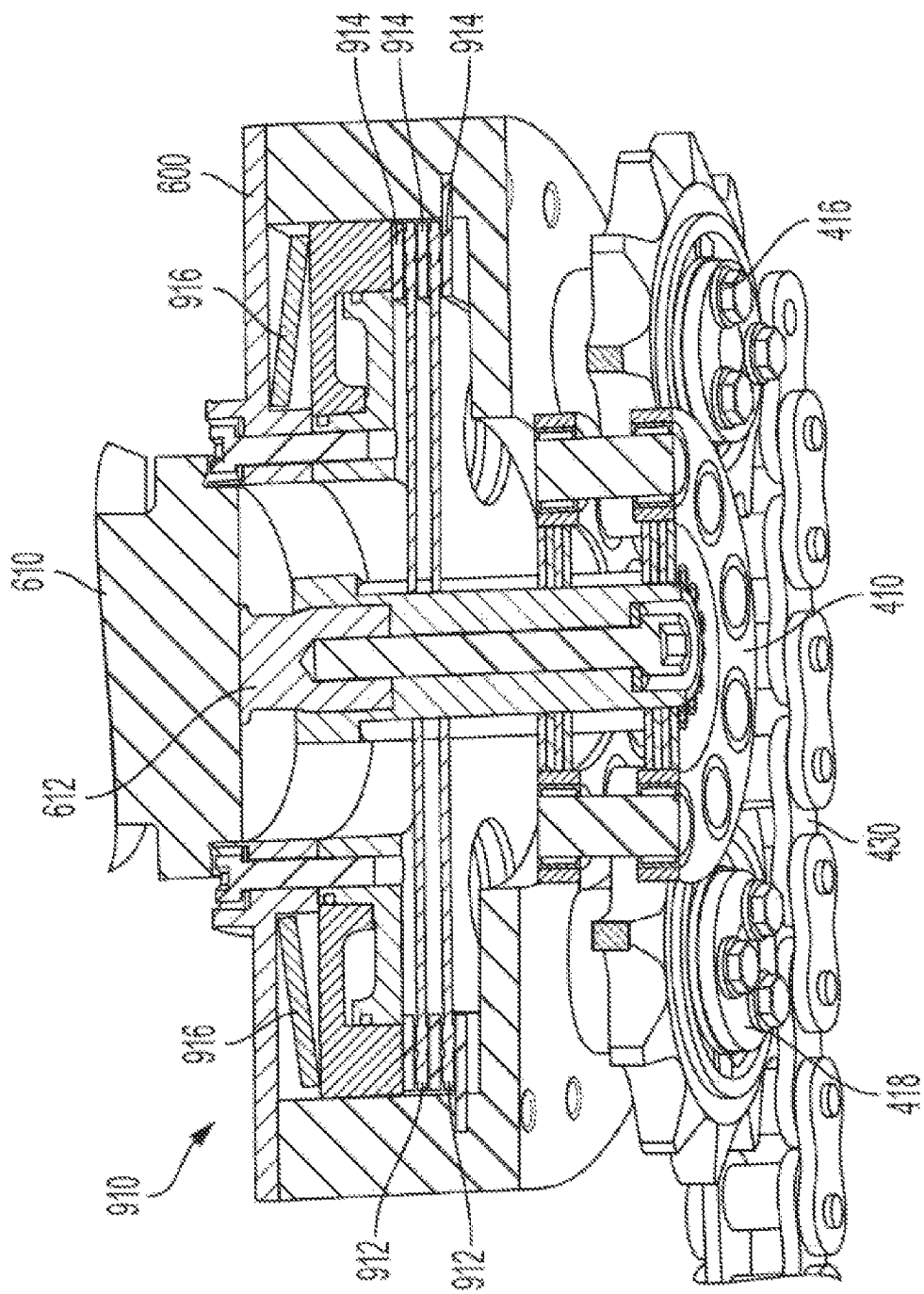
FIG. 9 illustrates a cross-section of the central housing of the improved single-chain drive assembly with an exemplary integrated parking brake.

The improved four wheel chain drive assembly 400 can also include an integrated parking brake as illustrated in FIG. 9. FIG. 9 illustrates a cross-section of the central housing 600, showing the drive shaft 612 extending from the drive motor 610, through the central housing 600 and into the lantern drive gear 410. A disc brake package 910 is shown in the interior of the central housing 600, where the drive shaft 612 passes through the disc brake package 910 between the drive motor 610 and the lantern drive gear 410. Other types of braking systems known in the art can be used instead of the exemplary disc brake package 910 shown here. The disc brake package 910 is a spring-applied, hydraulic-release parking brake that includes an engagement member 916, a plurality of brake discs 912 and a plurality of reactionary members 914. The brake discs 912 are rigidly attached to the drive shaft 612 and rotate with the drive shaft 612. The reactionary members 914 are stationary and rigidly attached to the central housing 600. When the brake 910 is engaged, the engagement member 916 is activated to compress the brake discs 912 between the stationary reactionary members 914 which prevent the brake discs 912 and drive shaft 612 from rotating. When the brake 910 is disengaged, the engagement member 916 is not activated which allows the brake discs 912 to rotate between the stationary reactionary members 914 and does not interfere with rotation of the drive shaft 612.

As described above, there are several advantages of the improved single-chain, four wheel drive assembly 400 over the prior double-chain, four wheel drive assembly 200 including the following. Two chains (one per side) replaces four chains (two per side). The single-chain allows a narrower chain case which allows a narrower vehicle 100 or a wider belly pan on the vehicle 100. The narrower chain case requires less oil in each chain case. The floating pinion of the lantern drive gear 410 reduces the size needed for the support bearings of the drive motor 610. The single-chain, four wheel drive assembly 400 also eliminates the chain loading caused by the small diameter drive sprockets 222, 272 of the prior double-chain, four wheel drive assembly 200 which should increase chain life. The integrated park brake 910 allows use of a standard cartridge motor or an e-machine instead of a custom motor. The single-chain, four wheel drive assembly 400 will also make for easier assembly.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A single chain drive for one side of an all-wheel drive vehicle, the single chain drive comprising:
    a drive sprocket;
    a drive motor coupled to the drive sprocket and configured to rotate the drive sprocket in forward and reverse directions;
    a first idler sprocket coupled to the drive sprocket and configured to rotate with the drive sprocket in the forward and reverse directions;
    a front axle sprocket coupled to a front axle and configured to rotate the front axle in the forward and reverse directions;
    a rear axle sprocket coupled to a rear axle and configured to rotate the rear axle in the forward and reverse directions; and
    a single chain coupled to the first idler sprocket, the front axle sprocket and the rear axle sprocket;
    wherein the drive motor is configured to rotate the drive sprocket, which is configured to rotate the first idler sprocket, which is configured to rotate the single chain, which is configured to rotate the front and rear axle sprockets, which are configured to rotate the front and rear axles, respectively.

2. The single chain drive of claim 1, wherein the drive sprocket is a lantern gear comprising:
    a front cover;
    a back cover; and
    a plurality of pins, each of the plurality of pins including a proximal end connected to the back cover and a distal end connected to the front cover.

3. The single chain drive of claim 2, wherein for each of the plurality of pins a rear needle bearing connects the proximal end of the pin to the back cover and a front needle bearing connects the distal end of the pin to the front cover.

4. The single chain drive of claim 2, wherein first idler sprocket comprises a plurality of teeth configured to mesh with the plurality of pins of the drive sprocket between the back and front covers of the drive sprocket.

5. The single chain drive of claim 2, further comprising:
    a drive shaft configured to couple the drive motor to the drive sprocket, wherein the drive shaft is connected to the back and front covers of the drive sprocket;
    wherein the drive motor is configured to rotate the drive shaft, which is configured to rotate the drive sprocket, which is configured to rotate the first idler sprocket, which is configured to rotate the single chain, which is configured to rotate the front and rear axle sprockets, which are configured to rotate the front and rear axles, respectively.

6. The single chain drive of claim 5, further comprising an integrated parking brake;
    wherein engagement of the integrated parking brake is configured to prevent rotation of the drive shaft, and disengagement of the integrated parking brake is configured to allow rotation of the drive shaft.

7. The single chain drive of claim 6, further comprising a stationary housing; and wherein the integrated parking brake comprises:
    an engagement member;
    a brake disc rigidly coupled to the drive shaft and configured to rotate with the drive shaft;
    a stationary reactionary member rigidly coupled to the stationary housing and configured to remain stationary;
    wherein when the integrated parking brake is engaged, the engagement member is activated to compress the brake disc against the stationary reactionary member to prevent rotation of the drive shaft, and
    wherein when the integrated parking brake is disengaged, the engagement member is not activated which allows the brake disc and the drive shaft to rotate freely.

8. The single chain drive of claim 1, further comprising a chain case configured to enclose the drive sprocket, the first idler sprocket, the single chain, and the front and rear axle sprockets; and further configured to hold lubricant to keep the single chain and sprocket connections lubricated.

9. The single chain drive of claim 1, wherein the drive sprocket, the first idler sprocket and the front and rear axle sprockets are sized to provide a desired gear reduction.

10. The single chain drive of claim 1, further comprising:
    a second idler sprocket coupled to the drive sprocket and the single chain;
    wherein the second idler sprocket is configured to rotate with the drive sprocket in the forward and reverse directions; and wherein the drive motor is configured to rotate the drive sprocket, which is configured to rotate the first and second idler sprockets, which are configured to rotate the single chain, which is configured to rotate the front and rear axle sprockets, which are configured to rotate the front and rear axles, respectively.

11. The single chain drive of claim 10, wherein the first idler sprocket is positioned above the drive sprocket between the drive sprocket and the single chain; and wherein the second idler sprocket is positioned below the drive sprocket between the drive sprocket and the single chain.

12. The single chain drive of claim 11, wherein the drive sprocket is a floating lantern gear comprising:
a front cover;
a back cover; and
a plurality of pins, each of the plurality of pins having a proximal end connected to the back cover and a distal end connected to the front cover;
wherein each of the first and second idler sprockets comprise a plurality of teeth configured to mesh with the plurality of pins of the drive sprocket between the back and front covers of the drive sprocket.

13. The single chain drive of claim 12, further comprising:
a drive shaft configured to couple the drive motor to the drive sprocket, wherein the drive shaft is connected to the back and front covers of the drive sprocket;
wherein the drive motor is configured to rotate the drive shaft, which is configured to rotate the drive sprocket, which is configured to rotate the first and second idler sprockets, which are configured to rotate the single chain, which is configured to rotate the front and rear axle sprockets, which are configured to rotate the front and rear axles, respectively.

14. The single chain drive of claim 13, further comprising an integrated parking brake;
wherein engagement of the integrated parking brake is configured to prevent rotation of the drive shaft, and disengagement of the integrated parking brake is configured to allow rotation of the drive shaft.

15. The single chain drive of claim 10, further comprising:
a third idler sprocket coupled to the drive sprocket and the single chain; and
a fourth idler sprocket coupled to the drive sprocket and the single chain;
wherein the third and fourth idler sprockets are configured to rotate with the drive sprocket in the forward and reverse directions; and
wherein the drive motor is configured to rotate the drive sprocket, which is configured to rotate the first, second, third and fourth idler sprockets, which are configured to rotate the single chain, which is configured to rotate the front and rear axle sprockets, which are configured to rotate the front and rear axles, respectively.

16. The single chain drive of claim 15, wherein the first idler sprocket is positioned above and forward of the drive sprocket between the drive sprocket and the single chain;
wherein the second idler sprocket is positioned below and forward of the drive sprocket between the drive sprocket and the single chain;
wherein the third idler sprocket is positioned below and rearward of the drive sprocket between the drive sprocket and the single chain; and
wherein the fourth idler sprocket is positioned above and rearward of the drive sprocket between the drive sprocket and the single chain.

17. The single chain drive of claim 15, wherein the drive sprocket, the first, second, third and fourth idler sprockets and the front and rear axle sprockets are sized to provide a desired gear reduction.

18. The single chain drive of claim 1, wherein the drive sprocket is a floating lantern gear comprising:
a front cover;
a back cover; and
a plurality of pins, each of the plurality of pins including a proximal end connected to the back cover and a distal end connected to the front cover;
wherein each of the first, second, third and fourth idler sprockets comprise a plurality of teeth configured to mesh with the plurality of pins of the drive sprocket between the back and front covers of the drive sprocket.

19. The single chain drive of claim 18, further comprising:
a drive shaft configured to couple the drive motor to the drive sprocket, wherein the drive shaft is connected to the back and front covers of the drive sprocket; and
an integrated parking brake;
wherein the drive motor is configured to rotate the drive shaft, which is configured to rotate the drive sprocket, which is configured to rotate the first, second, third and fourth idler sprockets, which are configured to rotate the single chain, which is configured to rotate the front and rear axle sprockets, which are configured to rotate the front and rear axles, respectively; and
wherein engagement of the integrated parking brake is configured to prevent rotation of the drive shaft, and disengagement of the integrated parking brake is configured to allow rotation of the drive shaft.

20. The single chain drive of claim 18, further comprising a chain case configured to enclose the drive sprocket, the first, second, third and fourth idler sprockets, the single chain, and the front and rear axle sprockets; and further configured to hold lubricant to keep the single chain and sprocket connections lubricated.

* * * * *